United States Patent
Prasanna et al.

(10) Patent No.: US 11,164,467 B2
(45) Date of Patent: Nov. 2, 2021

(54) METHOD FOR POST-FLIGHT DIAGNOSIS OF AIRCRAFT LANDING PROCESS

(71) Applicant: Rosemount Aerospace Inc., Burnsville, MN (US)

(72) Inventors: Ramamurthy Prasanna, Karnataka (IN); Ajay Byappanahalli Sundaramurthy, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 144 days.

(21) Appl. No.: 16/583,717

(22) Filed: Sep. 26, 2019

(65) Prior Publication Data
US 2021/0035458 A1 Feb. 4, 2021

(30) Foreign Application Priority Data
Jul. 31, 2019 (IN) .............................. 201911030958

(51) Int. Cl.
G08G 5/02 (2006.01)
B64D 45/04 (2006.01)
G05D 1/06 (2006.01)
G07C 5/08 (2006.01)

(52) U.S. Cl.
CPC .............. *G08G 5/02* (2013.01); *B64D 45/04* (2013.01); *G05D 1/0653* (2013.01); *G07C 5/0808* (2013.01); *G07C 5/0816* (2013.01)

(58) Field of Classification Search
CPC ........ G08G 5/02; B64D 45/04; G05D 1/0653; G07C 5/0808; G07C 5/0816
USPC ........................................................... 701/16
See application file for complete search history.

(56) References Cited

U.S. PATENT DOCUMENTS

| 5,499,025 A | 3/1996 | Middleton et al. |
| 2012/0259587 A1 | 10/2012 | Christian et al. |
| 2014/0343765 A1* | 11/2014 | Suiter .................. G08G 5/0021 701/18 |
| 2015/0019187 A1 | 1/2015 | Jones et al. |

(Continued)

OTHER PUBLICATIONS

EP Extended Search Report, Application No. 19212429.5-1202; dated Jun. 8, 2020; 11 pages.

(Continued)

*Primary Examiner* — Gertrude Arthur Jeanglaude
(74) *Attorney, Agent, or Firm* — Cantor Colburn LLP

(57) ABSTRACT

A method for an automated aircraft landing analysis including: receiving one or more aircraft landing performance parameters for one or more landing phases; determining a landing performance deviation for each of the one or more landing phases in response to the one or more aircraft landing performance parameters; identifying at least one of a system fault, a failure, and a pilot error that could have led to the landing performance deviations for each of the one or more landing phases; developing a fault tree for the landing performance deviations for each of the one or more landing phases; identifying measurable parameters, calculable parameters, inferable parameters, or observable parameters within the fault tree; converting the fault tree into a high level reasoning model using a standard inference methodology; performing a root cause analysis; identifying a root cause of the landing performance deviation; and displaying the root cause of landing performance deviation.

16 Claims, 6 Drawing Sheets

(56) References Cited

U.S. PATENT DOCUMENTS

| | | |
|---|---|---|
| 2015/0331975 A1 | 11/2015 | Garnier De Labareyre et al. |
| 2017/0148236 A1 | 5/2017 | Christian et al. |
| 2017/0283085 A1 | 10/2017 | Kearns et al. |
| 2018/0122248 A1 | 5/2018 | Mclees et al. |

OTHER PUBLICATIONS

Wei Hang Wu et al: "Towards Evidence-Based Architectural Design for Safety-Critical Software Applications", Jan. 1, 2007 (Jan. 1, 2007), Architecting Dependable Systems IV; [Lecture Notes in Computer Science], Springer Berlin Heidelberg, Berlin, Heidelberg, pp. 383-408, XP019066520, ISBN: 978-3-540-74033-9.

* cited by examiner

| LANDING PHASE/LANDING DISTANCE SEGMENT | ENTRY CRITERIA | EXIT CRITERIA |
|---|---|---|
| FLARE | • RADIO ALTITUDE IS THAN H FT<br>• TRANSITION FROM NEGATIVE TO POSITIVE PITCH RATE<br>• ENGINE IS IN IDLE CONDITION | "WEIGHT ON WHEELS" (WoW) IS TRUE<br><br>RADIO ALTITUDE = 0 |
| TOUCH DOWN | • WoW IS TRUE<br>• RADIO ALTITUDE = 0 | BRAKING DEVICES ARE FULLY DEPLOYED |
| AFTER LANDING GROUND ROLL | • WoW IS TRUE<br>• BRAKING DEVICES ARE FULLY DEPLOYED | GROUND SPEED < 20 KMPH |

FIG. 5

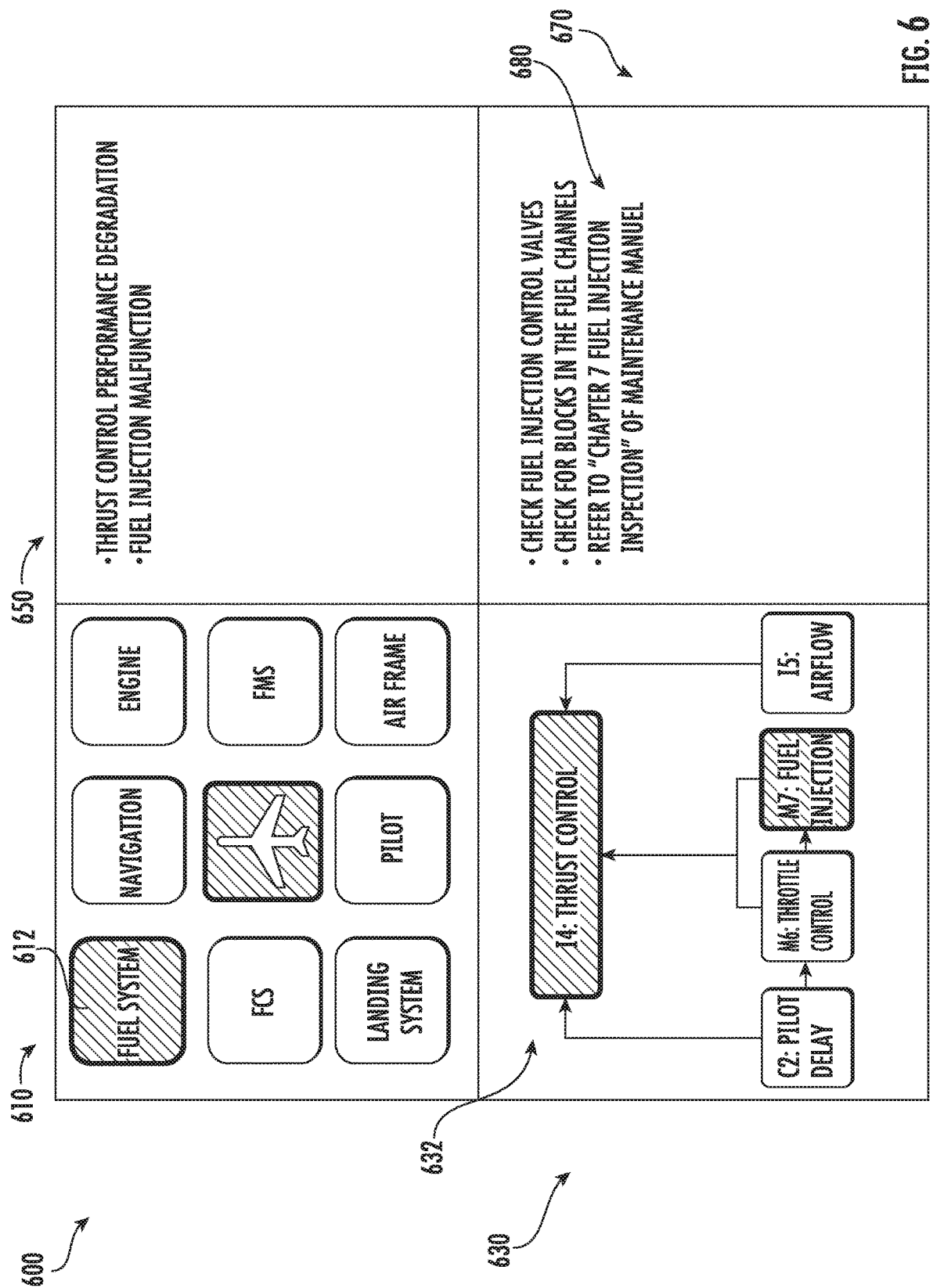

METHOD FOR POST-FLIGHT DIAGNOSIS OF AIRCRAFT LANDING PROCESS

CROSS-REFERENCE TO RELATED APPLICATIONS

This application claims the benefit of Provisional Indian Application No. 201911030958 filed Jul. 31, 2019, which is incorporated herein by reference in its entirety.

BACKGROUND

The subject matter disclosed herein generally relates to aircraft analysis tools, and more specifically, to an automated aircraft landing performance analysis.

Aircraft landing performance analysis includes analyzing hard landings and runway overruns. Hard landings are rough, uncontrolled landings which can result from performing landing with greater than normal vertical speed. Runway overruns occur when the aircraft exceeds the length of a particular runway during landing. Hard landings and runway overruns are directly related to aircraft landing performance, and a regular assessment of landing performance is necessary to avoid accidents and/or incidents.

BRIEF SUMMARY

According to one embodiment, a method for an automated aircraft landing analysis is provided. The method including: receiving one or more aircraft landing performance parameters for one or more landing phases; determining a landing performance deviation for each of the one or more landing phases in response to the one or more aircraft landing performance parameters; identifying at least one of a system fault, a failure, and a pilot error that could have led to the landing performance deviations for each of the one or more landing phases; developing a fault tree for the landing performance deviations for each of the one or more landing phases; identifying measurable parameters, calculable parameters, inferable parameters, or observable parameters within the fault tree; converting the fault tree into a high level reasoning model using a standard inference methodology; performing a root cause analysis by feeding the measurable parameters and calculable parameters as inputs into the high level reasoning model; identifying a root cause of the landing performance deviation in response to the root cause analysis; and displaying the root cause of the landing performance deviation.

In addition to one or more of the features described above, or as an alternative, further embodiments may include that the one or more landing phases includes at least one of an approach phase, a flare phase, a touchdown phase, and an after landing ground roll phase.

In addition to one or more of the features described above, or as an alternative, further embodiments may include: determining a recommended maintenance action in response to the root cause analysis; and displaying the recommended maintenance action.

In addition to one or more of the features described above, or as an alternative, further embodiments may include: displaying a hyperlink to the specific section of a digital maintenance manual that provides a detailed description of the recommended maintenance actions.

In addition to one or more of the features described above, or as an alternative, further embodiments may include: displaying the fault tree.

In addition to one or more of the features described above, or as an alternative, further embodiments may include: displaying aircraft systems associated with landing systems; and highlighting an aircraft system that included the root cause of the landing performance deviation.

In addition to one or more of the features described above, or as an alternative, further embodiments may include that the landing performance deviation is based on a deviation of the one or more aircraft landing performance parameters from at least one of a federal aviation administration (FAA) regulatory requirement, an in-flight landing parameters estimate, or a historical average performance.

In addition to one or more of the features described above, or as an alternative, further embodiments may include: displaying aircraft systems associated with landing systems in a first zone of graphical user interface; highlighting an aircraft system that included the root cause of the landing performance deviation; displaying the fault tree in a second zone of the graphical user interface; determining a recommended maintenance action in response to the root cause analysis; and displaying the recommended maintenance action in a fourth zone of the graphical user interface, wherein the root cause of the landing performance deviation is displayed in a third zone of the graphical user interface.

In addition to one or more of the features described above, or as an alternative, further embodiments may include that the automated landing analysis is performed irrespective of a reported incident to provide feedback to optimize the aircraft landing performance.

According to another embodiment, a system is provided. The system including: a processor; and a memory including computer-executable instructions that, when executed by the processor, cause the processor to perform operations for an automated landing analysis, the operations including: receiving one or more aircraft landing performance parameters for one or more landing phases; determining a landing performance deviation for each of the one or more landing phases in response to the one or more aircraft landing performance parameters; identifying at least one of a system fault, a failure, and a pilot error that could have led to the landing performance deviations for each of the one or more landing phases; developing a fault tree for the landing performance deviations for each of the one or more landing phases; identifying measurable parameters, calculable parameters, inferable parameters, or observable parameters within the fault tree; converting the fault tree into a high level reasoning model using a standard inference methodology; performing a root cause analysis by feeding the measurable parameters and calculable parameters as inputs into the high level reasoning model; identifying a root cause of the landing performance deviation in response to the root cause analysis; and displaying the root cause of the landing performance deviation.

In addition to one or more of the features described above, or as an alternative, further embodiments may include that the one or more landing phases includes at least one of an approach phase, a flare phase, a touchdown phase, and an after landing ground roll phase.

In addition to one or more of the features described above, or as an alternative, further embodiments may include that the operations further include: determining a recommended maintenance action in response to the root cause analysis; and displaying the recommended maintenance action.

In addition to one or more of the features described above, or as an alternative, further embodiments may include that the operations further include: displaying a hyperlink to the specific section of a digital maintenance manual that provides a detailed description of the recommended maintenance actions.

In addition to one or more of the features described above, or as an alternative, further embodiments may include that the operations further include: displaying the fault tree.

In addition to one or more of the features described above, or as an alternative, further embodiments may include that the operations further include: displaying aircraft systems associated with landing systems; and highlighting an aircraft system that included the root cause of the landing performance deviation.

In addition to one or more of the features described above, or as an alternative, further embodiments may include that the landing performance deviation is based on a deviation of the one or more aircraft landing performance parameters from at least one of a federal aviation administration (FAA) regulatory requirement, an in-flight landing parameters estimate, or a historical average performance.

In addition to one or more of the features described above, or as an alternative, further embodiments may include that the operations further include: displaying aircraft systems associated with landing systems in a first zone of graphical user interface; highlighting an aircraft system that included the root cause of the landing performance deviation; displaying the fault tree in a second zone of the graphical user interface; determining a recommended maintenance action in response to the root cause analysis; and displaying the recommended maintenance action in a fourth zone of the graphical user interface, wherein the root cause of the landing performance deviation is displayed in a third zone of the graphical user interface.

In addition to one or more of the features described above, or as an alternative, further embodiments may include that the operations for the automated landing analysis are performed irrespective of a reported incident to provide feedback to optimize the aircraft landing performance.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 5 depicts a table for automated aircraft landing analysis in accordance with one or more embodiments of the present disclosure; and FIG. 6 depicts a graphical user interface for automated aircraft landing analysis in accordance with one or more embodiments of the present disclosure.

DETAILED DESCRIPTION

A detailed description of one or more embodiments of the disclosed apparatus and method are presented herein by way of exemplification and not limitation with reference to the Figures.

In today's environment, aircraft landing performance analysis is carried out by the airlines post landing. The performance analysis includes the pilot providing personal observations on the landing. Also, airlines may initiate a detailed analysis and take necessary corrective actions if they so choose. Traditionally, the analysis is performed only in cases of major incidents or deviations from the regulatory norms. The regulatory norms can be provided by the federal aviation administration (FAA) guidelines.

In those landing events where there are no major incidents that are reported, deviations in the pilot's performance and aircraft system performance can still exist. In addition, the observations and records provided by the pilot are prone to human errors, verbal communication limitations, and subjective opinions which can lead to inconsistent feedback and analysis.

The techniques described herein provide a technique to perform the automated landing analysis irrespective of a reported incident to provide feedback to optimize the aircraft landing performance.

Figure 1:
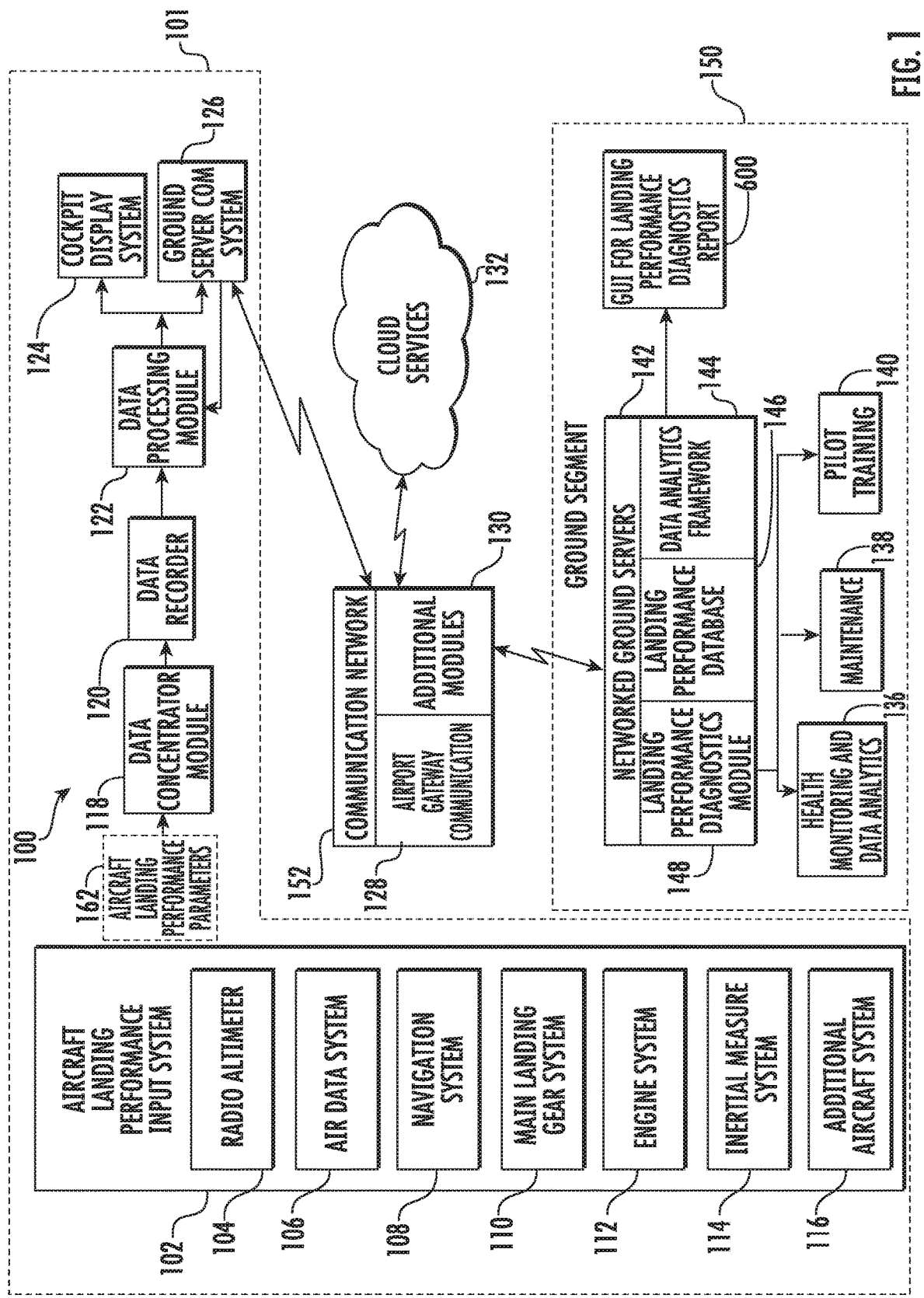
FIG. 1 depicts a block diagram for automated aircraft landing analysis in accordance with one or more embodiments of the present disclosure.

Referring now to FIG. 1, a system 100 for an aircraft landing performance analysis system (ALPAS) is illustrated, in accordance with one or more embodiments of the present disclosure. The system 100 includes an aircraft segment 101 and a ground segment 150.

The aircraft segment 101 includes the aircraft landing performance input system 102. The aircraft landing performance input system 102 includes one or more onboard sensors/systems with standard avionic communication interfaces to provide the aircraft landing performance parameters 162 used in landing performance analysis. For example, the aircraft landing performance input system 102 includes a radio altimeter 104, an air data system 106, a navigation system 108, a main landing gear system 110, an engine system 112, an inertial measure system 114, and an additional aircraft systems 116. It is to be understood that other systems and/or devices can be used and provided for analysis.

The aircraft segment 101 also includes a data concentrator module 118 which includes a processor/controller based hardware with multiple avionic communication interfaces and a software application for data acquisition and interface control.

A data recorder 120 includes solid state memory devices, and a processor/controller based hardware with input and output communication interfaces and a software application for data recording.

A data processing module 122 includes a processor having input and output communication interfaces and software applications for performing the aircraft landing performance analysis on the aircraft landing performance parameters 162 received from the aircraft landing performance input system 102. The data processing module 122 calculates the deviation of the landing distance with respect to at least one of a FAA regulatory requirement, an in-flight landing distance estimate, and historical average landing distance. Further analysis may be performed to calculate deviations in key parameters during various phases of landing (i.e., approach, flare, touch down and ground roll) with reference to standard landing procedure.

A cockpit display system 124 includes a digital display, processor/controller based hardware with input data/video interface and a software application to control the interfaces and the digital display. The digital display is configured to display a graphical user interface (GUI) to display information to a pilot viewing the digital display.

A ground server COM system 126 includes a processor/controller based hardware with an input data interface and an output interface module to a datalink and a software application to receive the data from the data processing module and to send/receive the data to/from the ground server through a communication network.

A communication network 152 and cloud services 132 interconnect the aircraft segment 101 and a ground segment 150. In one or more embodiments, the communication network 152 includes an airport gateway communication 128 and additional modules 130. Non-limiting examples of the additional modules 130 can include other communications systems such as Wi-Fi, cellular, and the like.

The ground segment 150 includes networked ground servers 142. The networked ground servers 142 include a landing analytics framework 144. The data analytics framework 144 provides standard analytics tool to analyze the aircraft landing performance parameters 162. The networked ground servers 142 also includes landing gear performance database 146. The ground servers 142 in the ground segment 150 include a landing performance diagnostics module 148. In one or more embodiments, the data processing module 122 calculates landing performance deviations in response to aircraft landing performance parameters 162. The landing performance diagnostic module 148 also identifies the root causes of the deviations. The landing performance diagnostics module 148 communicates with subsystems including the health monitoring and data analytics 136, maintenance 138, and pilot training 140. Other embodiments can include other systems that are coupled to the networked ground servers 142.

The aircraft segment 101 of the system 101 acquires and records the aircraft data from the aircraft landing performance input system 102 and historical landing data from the ground servers 142 and cloud services 132. The data processing module 122 analyzes the landing performance of the aircraft post landing based on the recorded data from the aircraft landing performance input system 102. The data processing module then provides the landing performance deviation data and the aircraft landing performance parameters 162 to the cloud service 132 and the ground segment 150.

The ground segment 150 of the system 101 provides the landing performance diagnostics module 148 to perform the diagnosis on the landing performance deviations and presents the diagnosis in a diagnostic report on the GUI 600 for displaying the landing performance diagnostics report. The landing performance diagnostics module 148 also archives the diagnostic report in a landing performance data base 146.

In one or more embodiments, the landing performance deviations can be associated with a single pilot, a single aircraft, a single model aircraft, etc. or any combination thereof. It is to be understood that other components such as processors, databases, modules, etc. can be used in the system.

Figure 2:
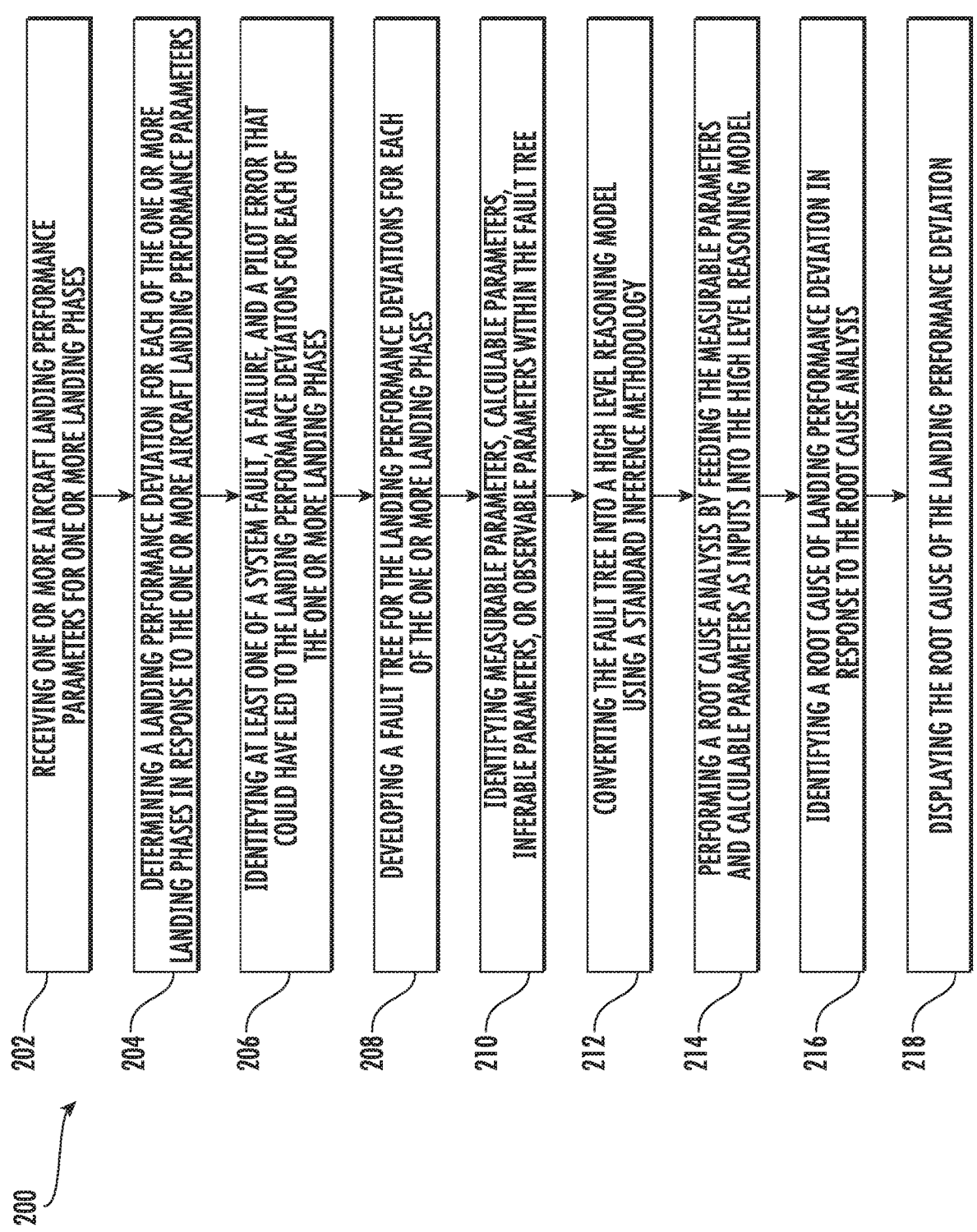
FIG. 2 depicts a flow diagram for automated aircraft landing analysis in accordance with one or more embodiments of the present disclosure.

Referring now to FIG. 2, with continued reference to FIG. 1, a method 200 for an automated aircraft landing performance deviation analysis is illustrated in accordance with one or more embodiments of the present disclosure. In an embodiment, the method 200 may be performed by the system 100 of FIG. 1. In an embodiment, the method 200 may be performed specifically by the networked ground server 142 of FIG. 1.

At block 202, one or more aircraft landing performance parameters 162 for one or more landing phases are received. In one or more embodiments, the aircraft landing performance parameters 162 are collected by the aircraft landing performance input system 102 and may include data that was recorded on the aircraft by a data recorder, which can be provided to the data processing module 122 as inputs for the analysis. In one or more embodiments, inputs for the landing performance analysis include a plurality of data, measurements, and parameters. In some embodiments, sensor measurements, subsystem status parameters, flight plan data, and computed parameters are used to analyze the aircraft landing performance.

Non-limiting examples of sensor measurement data can include radio altitude, outside air temperature, pressure altitude, air speed, ground speed, vertical speed, aircraft pitch angle, aircraft pitch rate, aircraft roll angle, aircraft heading, aircraft latitude, aircraft longitude, fuel weight, aircraft 3D acceleration vector, etc.

Non-limiting examples of subsystem status parameters can include main landing gear status, nose landing gear status, weight on wheels status, braking control output, braking device deployment status, reverse thruster deployment status, etc.

Data from the flight plan database can be retrieved. This data can include runway heading, runway length, runway threshold latitude-longitude, runway touchdown zone boundaries. Computed parameters can include the in-flight landing distance estimate. It is to be understood that other types of flight and landing data can be used.

At block 204, a landing performance deviation is determined for each of the one or more landing phases in response to the one or more aircraft landing performance parameters 162. In some embodiments, the landing performance deviation may be calculated with respect to (i.e., based on) FAA regulatory requirements, in-flight landing parameters estimates, and historical average performance of an aircraft under similar conditions. The one or more landing phases includes at least one of an approach phase, a flare phase, a touchdown phase, and an after landing ground roll phase (see also FIG. 5).

Figure 3:
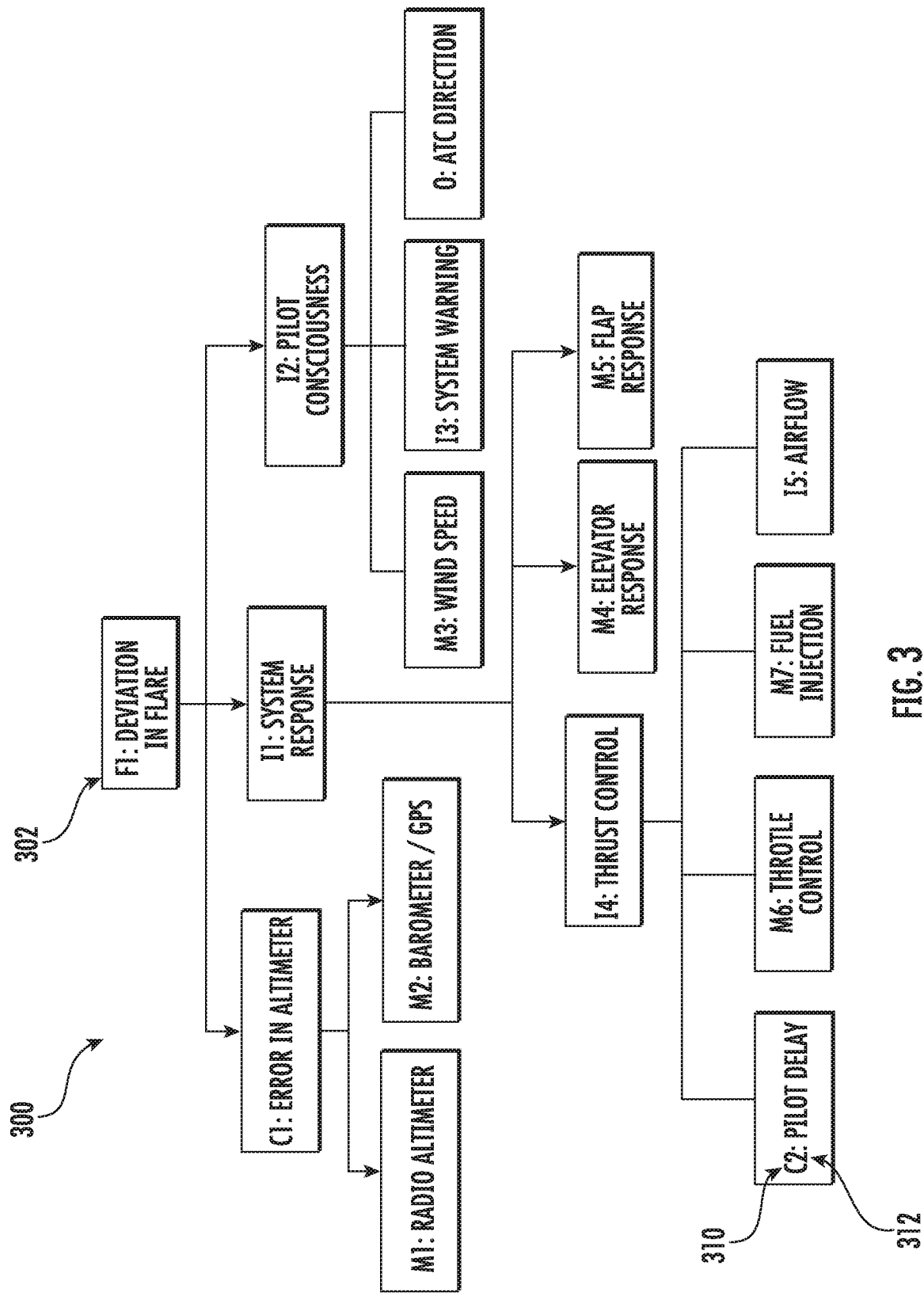
FIG. 3 depicts a fault tree for automated aircraft landing analysis in accordance with one or more embodiments of the present disclosure.

At block 206, at least one of a system fault, a failure, and a pilot error that could have led to the landing performance deviations is identified for each of the one or more landing phases. At block 208, a fault tree for the landing performance deviations is developed for each of the one or more landing phases. The fault tree includes the at one a system fault, a failure, and a pilot error determined at block 206. At block 210, measurable parameters, calculable parameters, inferable parameters, or observable parameters are identified within the fault tree. An example fault tree is illustrated in FIG. 3 and discussed herein. At block 212, the fault tree into a high level reasoning model using a standard inference methodology. The standard inference methodology may be a Bayesian network.

At block 214, a root cause analysis is performed by feeding the measurable parameters and calculable parameters as inputs into the high level reasoning model. The measurable parameters (e.g., altitude, air speed, pitch angle) are obtained from the recorded flight data of the aircraft landing performance input system 102. The measureable parameters is then used to calculate the calculable parameters, including, but not limited to, flight path angle, range, ground speed, wind speed, wind direction, and bearing. The inferable parameters are inferred by exercising the high level reasoning model using the measurable parameters and the calculable parameters.

At block 216, a root cause of the landing performance deviation is identified in response to the root cause analysis. The root causes of the landing performance deviations are identified by using the logical and probabilistic relationship established by the high level reasoning model between the high level faults with the lower level system faults, failures, or pilot errors. High level and low level faults are classified based on their position in the hierarchy of the fault tree 300 (see FIG. 3). For example, in FIG. 3, the high level failure "Deviation in Flare" is caused by a low level fault "Fuel injection" through the fault propagation defined by the fault tree 300.

A root cause may be determined for each landing performance deviation determined. Each root cause of has an associated conditional probability of occurrence and the higher the probability value of the root cause the stronger the contribution to the high level faults. The probability tables for the root causes that establish the relationship between the deviations in the high level reasoning model are initially provided by a system expert but can be updated and refined using trend analysis of the field failures and the input from a maintenance team.

At block 218, the root cause of the landing performance deviation is displayed. In one or more embodiments, the root cause of the landing performance deviation are presented to the maintenance crew through a landing performance application of the ground display system 600. In other embodiments, the root cause system failure is transmitted to a ground server or other external system for storing and further analysis. The identified landing performance deviations may generally be treated as high level faults. The lowest level faults are the root causes of the high level faults. Any intermediate level fault are considered as low level faults. For example, in FIG. 3, the high level failure "Deviation in Flare" is caused by a low level fault "Fuel injection" through the fault propagation defined by the fault tree 300.

The measurable parameters, calculable parameters, inferable parameters, or observable parameters are identified within the fault tree in accordance with block 210 using legends 310 and indexing 320. The legends include "M", "C", "I", "O", where "M" indicates a measurable parameter, "C" indicates a calculable parameter, "I" indicates an inferable parameters, and "O" indicates an observable parameter. The indexing 320 may be a sequential number next to the legend 310, such as, for example 1, 2, 3, 4, 5, etc. The legends 310 along with indexing 320 help to identify and simplify their use in the mathematical calculations.

Figure 4:
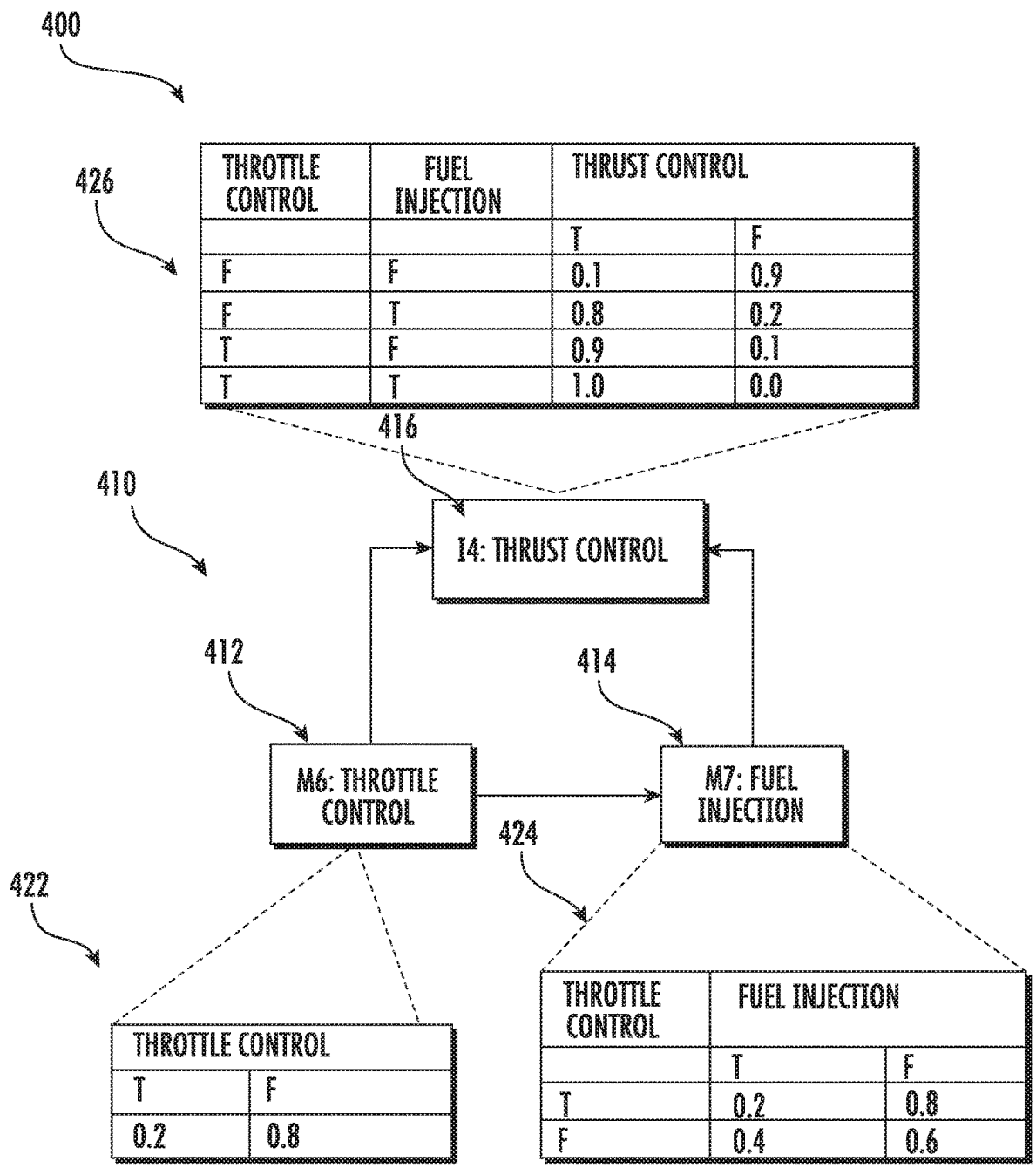
FIG. 4 depicts a section of the fault tree of FIG. 3 for automated aircraft landing analysis in accordance with one or more embodiments of the present disclosure.

Referring now to FIG. 4, with continued reference to FIGS. 1-3, a fault tree example 400 illustrates the analysis steps for deriving the probability of failure in throttle control given a fault in thrust control (i.e., the probability of the throttle control being the root cause of the thrust control failure) is illustrated, in accordance with an embodiment of the present disclosure. In the fault tree example 400, a fault tree 410 for the thrust control failure 420 is depicted by showing a dependency between each of the lower level faults as shown in FIG. 4. For simplification of illustration, this example 400 considers only two lower level faults of FIG. 4, which includes a throttle control fault 412 and a fuel injection fault 414 in the analysis. A complete analysis for a thrust control fault 416 would have considered all of the four lowest level faults including: pilot delay, throttle control, fuel injection, and airflow.

Based on the dependency relationship dictated by the system architecture and design, the probability/conditional probability tables for each lower level failure may be defined based on the domain expertise and field history, and related to the high level deviation (i.e., thrust control deviation). FIG. 4 illustrates a probability table 422 for the throttle control fault 412, a probability table 424 for the fuel injection fault 414, and a probability table 426 for the throttle control fault 412. Each probability table illustrates the probability of a true "T" and false "F" deviation.

After defining these probability tables 422, 424, 426, based on the dependency of each component, the probability of throttle control fault being the root cause of the thrust control fault is calculated by applying a Bayesian formula of conditional probability as illustrated in equation (i) as follows $$Pr_{(Throttle=T|Thrust=T)} = \frac{\sum Pr_{(Thrust=T,Throttle=T,Fuel\ injection)}}{\sum Pr_{(Thrust=T,Throttle,Fuel\ injection)}} \quad (i)$$

Once the values in the probability tables 422, 424, 426 are substituted into the above equation, the result shows 62% probability of throttle control fault given there is a fault in the thrust control. This is to illustrate that for a given deviation or identified deviation (through measurable or calculable parameters) the root causes can be identified with their probability of occurrence. The same approach can be applied to identify the root causes of other faults and come out with a list of top faults that could have caused the deviations in the performance during the flare phase and all other phases of landing.

Referring now to FIG. 5, table 500 for an automated aircraft landing analysis is illustrated, in accordance with one or more embodiments. Table 500 describes factors used to distinguish when each phase begins and ends. The phases include the approach phase, the flare phase, the touchdown phase, and the after landing ground roll phase.

The flare phase begins when the radio altitude is less than the height limit. In an embodiment, the flare height limit is a configurable threshold. Also, the flare phase begins as the aircraft pitch transitions from the negative to positive pitch rate and the engine is in the idle position. The flare phase ends when the "weight on wheels" (WoW) status reads true and the radio altitude is 0 ft.

After the flare phase, the touchdown phase begins when the WoW value is true and the radio altitude is 0 ft. The touchdown phase continues until the braking devices of the aircraft are fully deployed.

The after landing ground roll phase begins when the WoW value is true and the braking devices are fully deployed and continues until the ground speed is less than a threshold speed limit (e.g., 20 kmph).

Referring now to FIG. 6, a GUI 600 for automated aircraft landing analysis is illustrated, in accordance with one or more embodiments. The GUI 600 is primarily displayed on a ground server. The GUI 600 provides a graphical representation of landing performance diagnostics to report to the pilot, crew, and/or maintenance crew. The GUI 600 may be updated with each landing of the aircraft. The GUI 600 is segmented into different quadrants or zones, including a first zone 610, a second zone 630, a third zone 650, and a fourth zone 670.

The first zone 610 displays various icons 612, each icon 612 representing a major aircraft sub-system or component that is part of the landing process. The icons 612 of the systems that are diagnosed to have degradation or faults contributing to the landing performance deviations are highlighted or illuminated. The user of the GUI 600 can select any of the highlighted system icons 612 to see the details of the degradation or faults in the system in the third zone 650 and recommended maintenance actions in the fourth zone 670. In the example illustrated in FIG. 6, the icon representing the fuel system is highlighted.

The second zone 630 displays the fault tree 632 corresponding to the failures of the system selected in zone 1. The root-cause faults that contribute to high level faults in the fault tree 632 are highlighted. Advantageously, this may help a user of the GUI 600 understand all the low level faults that could cause the high level system faults and focus on the maintenance aspects of the highlighted components. In the example illustrated in FIG. 6, the thrust control and the fuel injection are highlighted in the fault tree 632.

The third zone 650 displays a more detailed textual description of the root-cause faults highlighted in the second zone 630. The fourth zone 670 displays recommended maintenance actions derived from the maintenance manual for the root-cause faults described in the third zone 650. The fourth zone 670 may also provide a hyperlink 680 to the specific section of the digital maintenance manual that provides a detailed description of the maintenance actions that need to be performed to rectify the root-cause fault. The representation can be updated as the aircraft performs a landing on different runways.

Techniques are provided to regularly detect, analyze, and address landing performance deviations including those deviations that may not result in a major or noticeable incident. In addition, the collected data can be used to validate the pilot's observations and records on the landing performance. The feedback on the landing performance can be provided to the pilot and/or airlines in an efficient manner. The techniques described herein a method and system to improve the landing performance and early detection of aircraft maintenance issues.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for an automated aircraft landing analysis, the method comprising:
   receiving one or more aircraft landing performance parameters for one or more landing phases;
   determining a landing performance deviation for each of the one or more landing phases in response to the one or more aircraft landing performance parameters;
   identifying at least one of a system fault, a failure, and a pilot error that could have led to the landing performance deviations for each of the one or more landing phases;
   developing a fault tree for the landing performance deviations for each of the one or more landing phases;
   identifying measurable parameters and calculable parameters within the fault tree,
      wherein the measurable parameters are obtained from a recorded flight data of an aircraft landing performance input system, and
      wherein the calculable parameters are calculated based on the measurable parameters;
   converting the fault tree into a high level reasoning model using a standard inference methodology;
   performing a root cause analysis by feeding the measurable parameters and calculable parameters as inputs into the high level reasoning model;
   identifying a root cause of the landing performance deviation based on the root cause analysis;
   displaying the root cause of the landing performance deviation;
   determining a recommended maintenance action in response to the root cause analysis; and
   displaying the recommended maintenance action.

2. The method of claim 1, wherein the one or more landing phases includes at least one of an approach phase, a flare phase, a touchdown phase, and an after landing ground roll phase.

3. The method of claim 1, further comprising:
   determining a specific section of a digital maintenance manual that provides a detailed description of the recommended maintenance actions; and
   displaying a hyperlink to the specific section of a digital maintenance manual that provides the detailed description of the recommended maintenance actions.

4. The method of claim 1, further comprising:
   displaying the fault tree.

5. The method of claim 1, further comprising:
   displaying aircraft systems associated with landing systems; and
   highlighting an aircraft system that included the root cause of the landing performance deviation.

6. The method of claim 1, wherein the landing performance deviation is based on a deviation of the one or more aircraft landing performance parameters from at least one of a federal aviation administration (FAA) regulatory requirement, an in-flight landing parameters estimate, or a historical average performance.

7. The method of claim 1, further comprising:
displaying aircraft systems associated with landing systems in a first zone of graphical user interface;
highlighting an aircraft system that included the root cause of the landing performance deviation;
displaying the fault tree in a second zone of the graphical user interface;
determining a recommended maintenance action in response to the root cause analysis; and
displaying the recommended maintenance action in a fourth zone of the graphical user interface,
wherein the root cause of the landing performance deviation is displayed in a third zone of the graphical user interface.

8. The method of claim 1, wherein the automated landing analysis is performed irrespective of a reported incident to provide feedback to optimize the aircraft landing performance.

9. A system, comprising:
a processor; and
a memory comprising computer-executable instructions that, when executed by the processor, cause the processor to perform operations for an automated landing analysis, the operations comprising:
receiving one or more aircraft landing performance parameters for one or more landing phases;
determining a landing performance deviation for each of the one or more landing phases in response to the one or more aircraft landing performance parameters;
identifying at least one of a system fault, a failure, and a pilot error that could have led to the landing performance deviations for each of the one or more landing phases;
developing a fault tree for the landing performance deviations for each of the one or more landing phases;
identifying measurable parameters and calculable parameters within the fault tree,
wherein the measurable parameters are obtained from a recorded flight data of an aircraft landing performance input system,
wherein the calculable parameters are calculated based on the measurable parameters;
converting the fault tree into a high level reasoning model using a standard inference methodology;
performing a root cause analysis by feeding the measurable parameters and calculable parameters as inputs into the high level reasoning model;
identifying a root cause of the landing performance deviation based on the root cause analysis;
displaying the root cause of the landing performance deviation,
determining a recommended maintenance action in response to the root cause analysis; and
displaying the recommended maintenance action.

10. The system of claim 9, wherein the one or more landing phases includes at least one of an approach phase, a flare phase, a touchdown phase, and an after landing ground roll phase.

11. The system of claim 9, wherein the operations further comprise:
determining a specific section of a digital maintenance manual that provides a detailed description of the recommended maintenance actions, and
displaying a hyperlink to the specific section of a digital maintenance manual that provides the detailed description of the recommended maintenance actions.

12. The system of claim 9, wherein the operations further comprise:
displaying the fault tree.

13. The system of claim 9, wherein the operations further comprise:
displaying aircraft systems associated with landing systems; and
highlighting an aircraft system that included the root cause of the landing performance deviation.

14. The system of claim 9, wherein the landing performance deviation is based on a deviation of the one or more aircraft landing performance parameters from at least one of a federal aviation administration (FAA) regulatory requirement, an in-flight landing parameters estimate, or a historical average performance.

15. The system of claim 9, wherein the operations further comprise:
displaying aircraft systems associated with landing systems in a first zone of graphical user interface;
highlighting an aircraft system that included the root cause of the landing performance deviation;
displaying the fault tree in a second zone of the graphical user interface;
determining a recommended maintenance action in response to the root cause analysis; and
displaying the recommended maintenance action in a fourth zone of the graphical user interface,
wherein the root cause of the landing performance deviation is displayed in a third zone of the graphical user interface.

16. The system of claim 9, wherein the operations for the automated landing analysis are performed irrespective of a reported incident to provide feedback to optimize the aircraft landing performance.

* * * * *